United States Patent
Nicolai et al.

(10) Patent No.: US 6,237,920 B1
(45) Date of Patent: May 29, 2001

(54) SEALING ASSEMBLY

(75) Inventors: Michael Nicolai, Offenbach; Amrei Löbert, Lohmar, both of (DE)

(73) Assignee: GKN Lobro GmbH (DE)

( * ) Notice: Subject to any disclaimer, the term of this patent is extended or adjusted under 35 U.S.C. 154(b) by 0 days.

(21) Appl. No.: 09/135,437

(22) Filed: Aug. 17, 1998

(30) Foreign Application Priority Data

Aug. 22, 1997 (DE) .............................. 197 36 546

(51) Int. Cl.$^7$ .................................................. F16D 1/02
(52) U.S. Cl. ...................... 277/630; 277/637; 277/641; 464/173
(58) Field of Search ..................... 464/173, 131, 464/905; 277/630, 637, 641

(56) References Cited

U.S. PATENT DOCUMENTS

| | | | |
|---|---|---|---|
| 4,436,310 | * 3/1984 | Sawabe et al. | 277/11 |
| 5,678,933 | * 10/1997 | Ouchi et al. | 384/448 |
| 5,938,208 | * 8/1999 | Yoshida et al. | 277/592 |
| 5,984,039 | * 11/1999 | Mayr | 180/248 |

FOREIGN PATENT DOCUMENTS

| | | |
|---|---|---|
| 29 21 292 A1 | 11/1979 | (DE) . |
| 32 10 389 A1 | 4/1983 | (DE) . |
| 43 09 652 A1 | 3/1993 | (DE) . |
| 1 078 563 | 8/1967 | (GB) . |

* cited by examiner

Primary Examiner—Anthony Knight
Assistant Examiner—Enoch E Peavey

(57) ABSTRACT

A sealing assembly is incorporated into a constant velocity universal joint. The joint has an inner joint part connected to a shaft shank and an outer joint part which is sealed relative to the shaft shank and which has a flange face, relative to which outer joint part there is braced a counter flange which has a counter flange face. A sealing cover is disposed at the outer joint part, and clamped in an edge region between the outer joint part and the counter flange. The flange face directly contacts the counter flange face in an annular contact region. An annular gap is formed radially inside the contact region between the flange face and the counter flange face. The sealing cover is located in the annular gap with its edge region. The sealing cover is connected to the outer joint part by means of an adhesive layer which consists of a sealing agent and which is applied so as to have a sealing effect relative to the flange face and relative to the sealing cover. The sealing cover is at least partially displaced into the annular gap by the counter flange while being under permanent pretension.

14 Claims, 4 Drawing Sheets

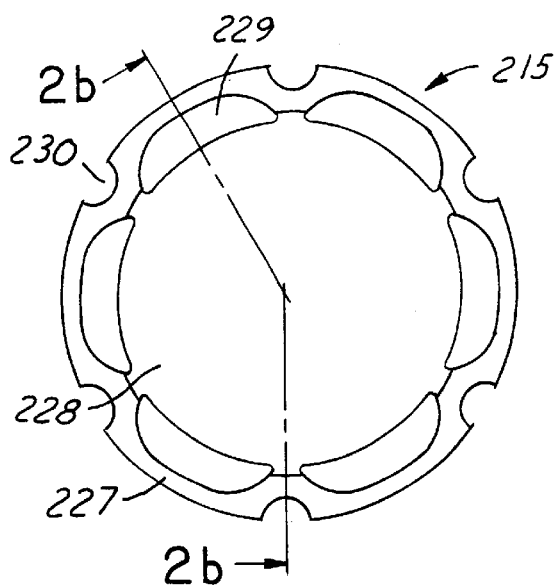
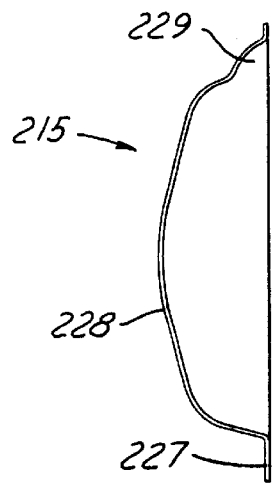
FIG.2a
FIG.2b
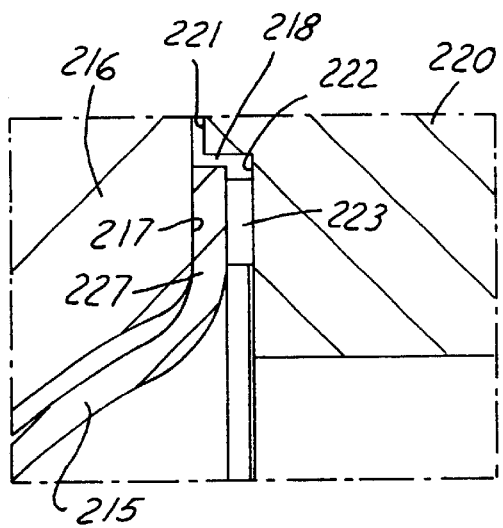
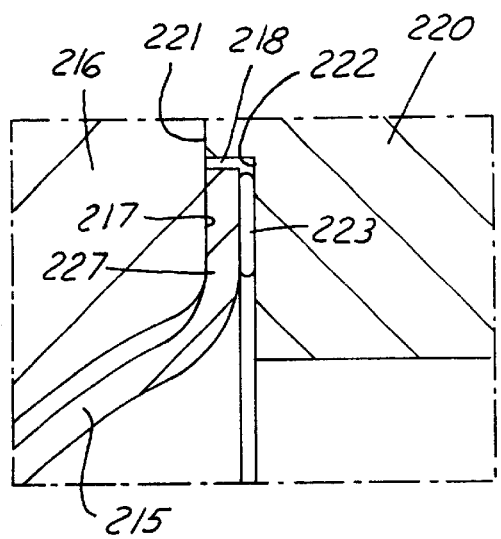
FIG.2c
FIG.2d

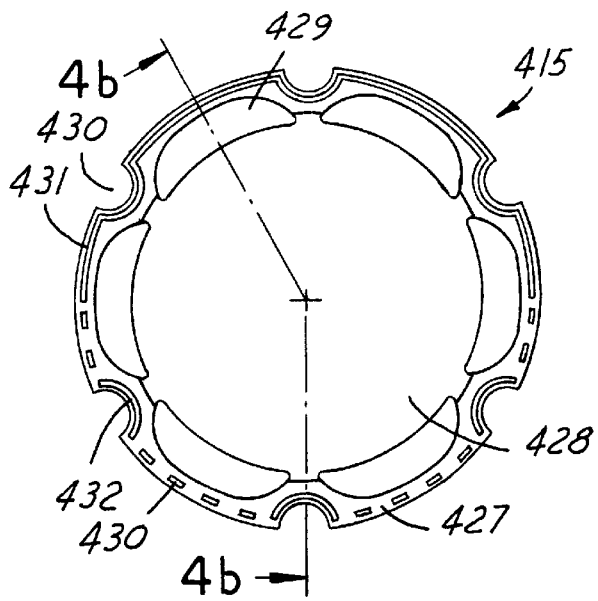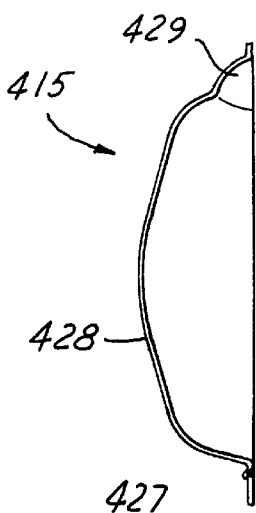
FIG.4a  FIG.4b
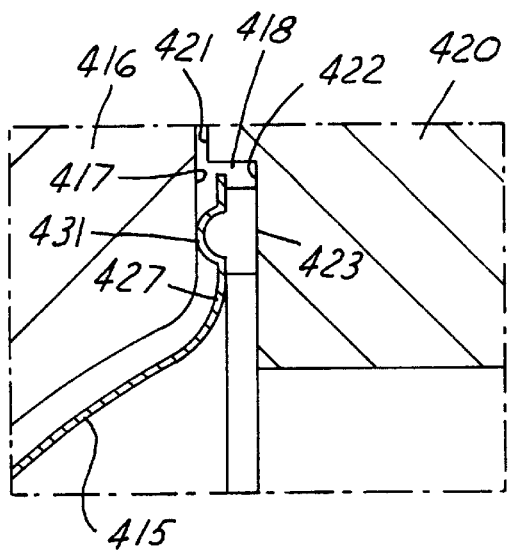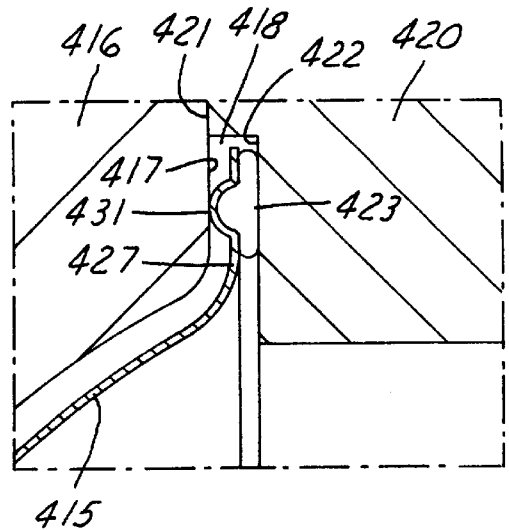
FIG.4c  FIG.4d

SEALING ASSEMBLY

BACKGROUND OF THE INVENTION

The invention relates to a sealing assembly for a constant velocity universal joint. The joint includes an inner joint part which is connected to a driveshaft and an outer joint part which is sealed relative to the driveshaft by a convoluted boot and which has a flange face, directly contacted by a counter flange face of a counter flange in an annular contact region. An annular gap is formed radially inside the contact region between the flange face and the counter flange face. A sealing cover is provided at the outer joint part, which sealing cover, with an edge region of same, is located in the annular gap.

Constant velocity universal joints in the present sense may be constant velocity universal ball joints, tripode joints or similar joints serving the transmission of torque. Constant velocity universal joints of these types are normally marketed as integral parts of complete driveshafts consisting of a shaft shank and two joints mounted at the ends of the shaft shank. The joints are provided with a grease filling. The respective outer joint parts are ready to be mounted on counter flanges and are sealed relative to the shaft shank by convoluted boots. At their outer flange faces they are sealed by plate metal covers which do not only prevent the grease filling from leaving the joint during transport and assembly, and also in operation when the grease filling becomes highly liquid due to an increase in temperature and is under the influence of a centrifugal force. This objective cannot be achieved by the flange faces of the outer joint parts and the counter flange faces of the counter flanges, which flange faces and counter flange faces contact one another, because the latter are forged faces and as such they are produced too inaccurately.

U.S. Pat. No. 4,436,310 describes a sealing assembly for a constant velocity universal joint of this type wherein the constant velocity universal joint is provided in the form of a tripode joint which, in consequence, has a flange face which is not rotationally symmetric. To avoid any positional errors of the sealing cover relative to the outer joint part, there are provided engaging means in the flange face and at the sealing cover. The sealing cover is annularly clamped between the flange face of the outer joint part and the counter flange face of the counter flange; it is thus forcelockingly connected to the two parts and, in consequence, is included in the torque flow of the driveshaft after the latter has been mounted. This means that special requirements have to be met by the material properties and the production quality of the three parts.

It is therefore the object of the present invention to provide a sealing assembly of this type which can be produced more cost-effectively and with greater tolerances, but which, at the same time, ensures a reliable sealing function under all operating conditions.

SUMMARY OF THE INVENTION

The objective is achieved in that the flange face directly contacts the counter flange face in an annular contact region, with an annular gap being formed radially inside the contact region between the flange face and the counter flange face. The sealing cover is located in the annular gap with its edge region. The sealing cover is connected to the outer joint part by means of an adhesive layer which consists of a sealing agent applied so as to have a sealing effect relative to the flange face and relative to the sealing cover. The sealing cover is at least partially displaced into the annular gap by the counter flange. This occurs while the outer joint part and the counter flange are braced together with the sealing cover being maintained under permanent pretension. These means permit a cost-effective connection between the sealing cover and the outer joint part, which connection can be established easily and quickly, and satisfactorily meets the requirements of a reliable seal which is effective until the driveshaft is fully assembled, i.e. until the outer joint part is connected to the counter flange. Those versed in the art have access to adhesives which act as sealing agents and are characterized by adequate holding forces which withstand the loads expected during transport and assembly. However, no great demands are made regarding the accuracy of the glued connection which, relative to the design of the flange and of the sealing cover, merely has to ensure that the sealing cover projects beyond a plane which is defined by the counter flange face after the outer joint part and the counter flange have been tensioned relative to one another. In this way, the sealing cover is partially displaced by the counter flange face into the annular gap, while a permanent pretension is maintained between the sealing cover and the counter flange face, which permanent pretension is added to the previously effective adhesion forces. As a result of this glued connection secured in this way, the driveshaft is adequately sealed under operating conditions which, at speeds of 9000 r.p.m., are characterized by increased operating temperatures combined with a correspondingly high internal pressure and extreme mechanical loads in the form of vibrations and impacts. The sealing cover radially ending in the annular gap is kept out of the flow of force between the flange face and counter flange face and out of the torque flow between the outer joint part and the counter flange. This means that the sealing cover can be produced from inferior materials and with a relatively reduced production accuracy. In particular, the sealing cover can consist of plastics and can be produced by injection molding or deep-drawing, or it can consist of rubber which, if necessary, is reinforced by fabric or fibers. The sealing cover can also consist of plate metal which can be plastic-coated to provide protection against corrosion.

In order to achieve the partial displacement or deformation of the sealing cover into the annular gap during the assembly of the outer joint part and the counter flange, different embodiments regarding the combination of sealing cover and adhesive layer are possible.

According to a first embodiment, the sealing cover is displaced into the annular gap, with the adhesive layer being elastically and/or plastically deformed. This requires a permanently elastic adhesive which, while having an adequate thickness, becomes a structural and functional element.

According to a second embodiment it is proposed that the sealing cover is displaced into the annular gap, with the edge region of same being elastically and/or plastically deformed.

By plastically deforming part of the sealing cover it becomes possible in a particularly advantageous way to compensate for production inaccuracies at the counter flange face and thus to produce the counter flange face in a less refined quality. In consequence, the counter flange can be a forging with an unmachined counter flange face.

In this embodiment, it is possible for the layer of adhesive to be relatively unresilient and thin and to achieve the secure contact between the counter flange and the sealing cover under pretension by elastically deforming the sealing cover, especially in an annular region. In particular, it is possible to provide the edge of the sealing cover with easily deformable formations or to shape it in such a way that it is conical in a plate-spring-like way.

In all the above-mentioned embodiments it is possible that either a continuous edge of the sealing cover is in contact with the counter flange face or that circumferentially interrupted nap or rib regions of the sealing cover are in contact with the counter flange face. In the latter case, it is possible to achieve greater axial deformation distances at relatively lower forces.

Some advantageous embodiments of the invention are illustrated below with reference to the drawings wherein

BRIEF DESCRIPTION OF THE DRAWINGS

FIG. 2 shows details of an inventive sealing assembly in a first embodiment, i.e.
 a) a sealing cover in a plan view,
 b) the sealing cover in an axial section,
 c) installation details prior to tensioning,
 d) installation details after tensioning.

FIG. 4 shows details of an inventive sealing assembly in a third embodiment, i.e.
 a) a sealing cover in a plan view,
 b) the sealing cover in an axial section,
 c) installation details prior to tensioning
 d) installation details after tensioning.

DETAILED DESCRIPTION OF A PREFERRED EMBODIMENT

Figure 1:
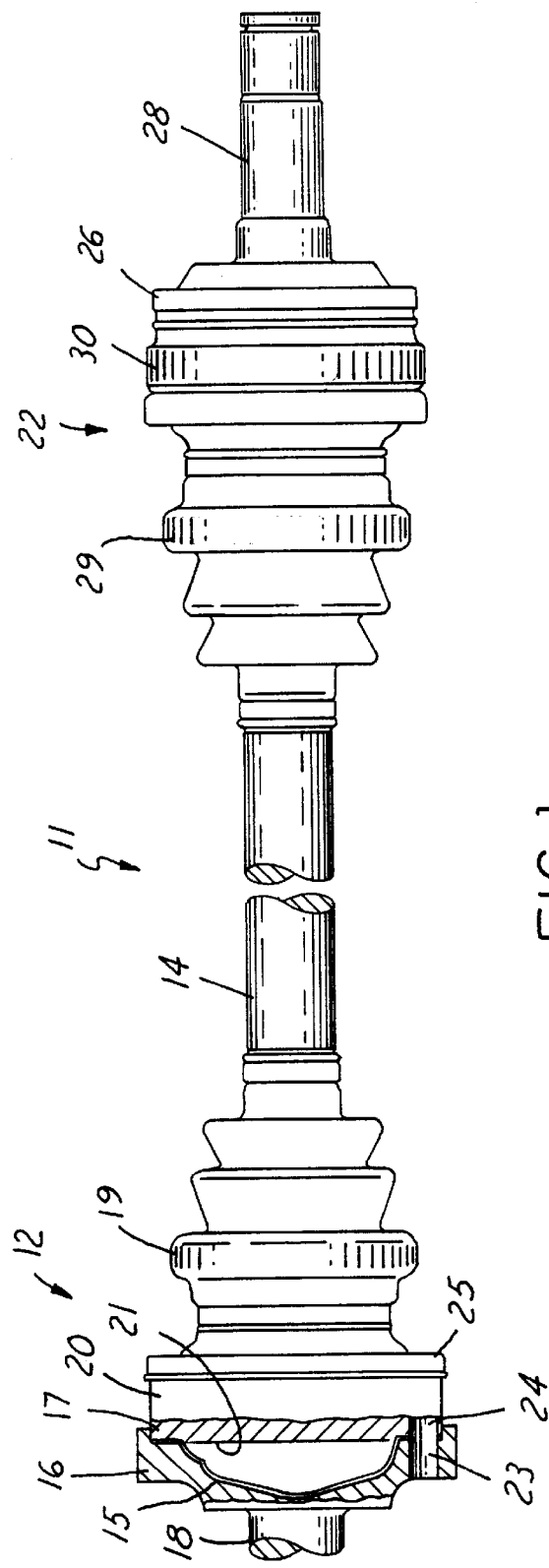
FIG. 1 is a plan view of a driveshaft, with an inventive sealing assembly being shown in an axial section.
Figure 3A:
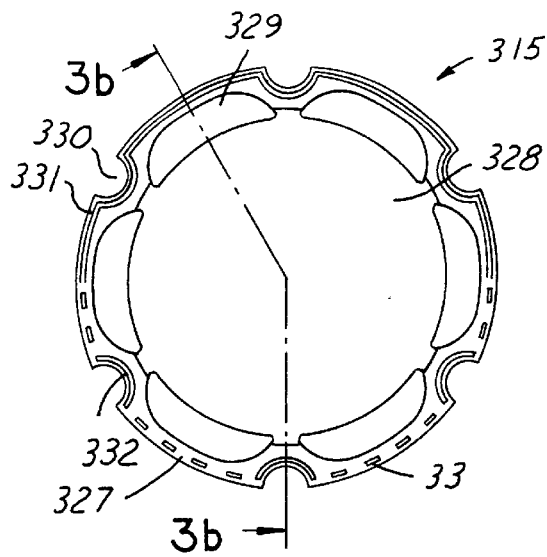
FIG. 3 shows details of an inventive sealing assembly in a second embodiment, i.e.
 a) a sealing cover in a plan view,
 b) the sealing cover in an axial section,
 c) installation details prior to tensioning,
 d) installation details after tensioning.
Figure 3B:
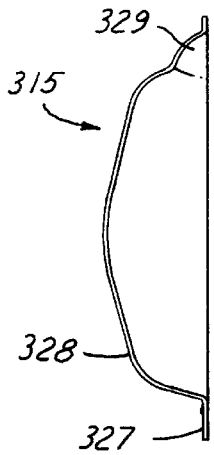
Figure 3C:
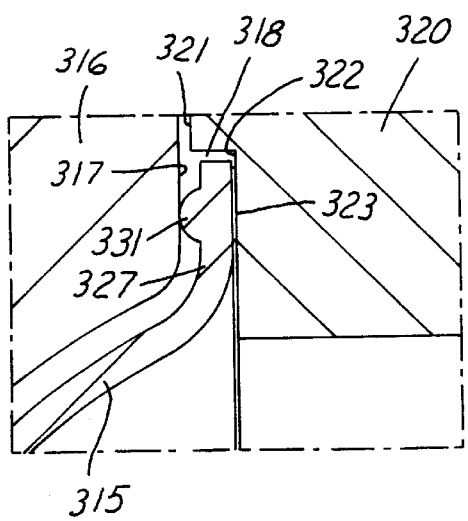
Figure 3D:
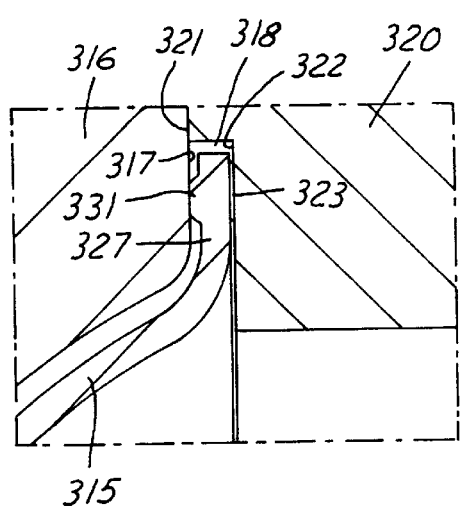

FIG. 1 shows a driveshaft 11 with two constant velocity universal joints 12, 22, a shaft shank 14 connected to the unidentifiable inner joint parts of the constant velocity universal joints, and two counter flanges 16, 26 which are each produced so as to be integral with the adjoining shaft journals 18, 28 and which are braced relative to the outer joint parts 20, 30 of the constant velocity universal joints 12, 22. The space between the outer joint parts 20, 30 and the shaft shank 14 is covered by convoluted boots 19, 29. The partial longitudinal section shows an inventive sealing assembly at the constant velocity universal joint 12, which sealing assembly comprises a sealing cover 15 which is positioned between a flange face 21 at the outer joint part 20 and a counter flange face 17 at the counter flange 16. Further details are provided in the form of a threaded hole 23 in the counter flange 16 and a through-hole 24 in the outer joint part 20, into which holes 23, 24 it is possible to thread bolts 25 which are indicated by center lines only. As far as further details are concerned, reference is made to the subsequent Figures.

FIG. 2, in a) and b), shows an inventive sealing cover 215 to be used for a constant velocity universal ball joint with six balls. The cover, in the axial view, is substantially round and comprises an edge region 227 and a central pressed-out portion 228 which is mounted to as to point towards the counter flange, so that, when the joint is articulated, parts of the inner joint part and of the cage are able to enter said pressed-out or bulged-out portion 228. In the edge region 227, there are pressed out six individual pockets 229 which can be partially entered by the balls when the joint is articulated.

Between each two pockets 229, there are provided, from the outer edge, recesses 230 with circular-arch-shaped boundaries to allow the passage of the bolts mentioned in connection with FIG. 1.

In each of the illustrations c) and d), there is shown an outer portion of an outer joint part 220 with a flange face 221 and a recess 222 on the right and a counter flange 216 with a planar counter flange face 217 on the left. Between the recess 222 and the counter flange face 217 there is formed an annular gap 218 into which there projects the edge region 227 of a sealing cover 215. The sealing cover 215 is glued into the recess 222 by means of an adhesive layer 223. In illustration c), the edge region 227 projects beyond the flange face 221 before the outer joint part 220 and the counter flange 216 are braced relative to one another.

In illustration d), the flange face 221 and the counter flange face 217 contact one another in a braced condition. The adhesive layer 223 is deformed under permanent elastic pretension, and pressed flat. The gap thickness shown in illustration c) comprises part of the tolerance permitted when producing the recess 221. The geometric conditions at the outer joint part 220 and at the counter flange 216 can also be interchanged, i.e. the flange face may be planar and the counter flange face may be provided with a recess.

FIG. 3, in illustrations a) and b), shows an inventive sealing cover 315 to be used in a constant velocity universal ball joint with six balls. In the axial view, the cover is substantially round and comprises an edge region 327 and a central pressed-out portion 328 which is mounted so as to point towards the counter flange, so that, when the joint is articulated, parts of the inner joint part and of the cage can enter the pressed-out or bulged-out portion 328. In the edge region 327, there are pressed out six individual pockets 329 into which the balls can partially enter when the joint is articulated.

Between each two pockets 329, from the outer edge, there are provided recesses 330 with circular-arch-shaped boundaries which permit the passage of the bolts mentioned in connection with FIG. 1. In illustration a), in a plan view, in the upper half of the Figure, there is shown a continuous bead 331 which extends along the outer edge of the planar edge region and parallel to the boundary edge, and in the lower half of the Figure there are shown interrupted bead portions 332 and naps 333 whose function will be explained below with reference to further illustrations.

Illustrations c) and d), on the right, show an outer portion of an outer joint part 320 with a flange face 321 and a recess 322 therein, and on the left, they each show a counter flange 316 with a planar counter flange face 317. Between the recess 322 and the counter flange face 317 there is formed an annular gap 318 into which there extends the edge region 327 of a sealing cover 315. The sealing cover is secured in the recess by means of an adhesive layer 323. In illustration c), the annular bead 331 projects beyond the flange plane 321 before the outer joint part and flange are braced relative to one another.

In illustration d), the flange face 321 and the counter flange face 317 contact one another in a braced way. The annular bead 331 is plastically deformed under permanent elastic pretension, and pressed flat, with the same elastic pretension being maintained in the relatively inelastic adhesive layer. The gap thickness shown in illustration c) comprises part of the tolerance permitted when producing the recess 321.

The geometric conditions at the outer joint part 321 and at the counter flange 316 can be interchanged, i.e. the flange face can be planar and the counter flange face can be provided with a recess.

FIG. 4, in illustrations a) and b), shows an inventive sealing cover 415 to be used in a constant velocity universal ball joint with six balls. In the axial view, the cover is substantially round and comprises an edge region 427 and a central pressed-out portion 428 which is mounted so as to point towards the counter flange, so that, when the joint is articulated, parts of the inner joint part and of the cage are able to enter the pressed-out or bulged-out portion 428. In the edge region 427, there are pressed out six individual pockets 429 into which the balls can partially enter when the joint is articulated.

Between each two pockets 429, there are provided, from the outer edge, recesses 430 with circular-arch-shaped boundaries which permit the passage of the bolts mentioned in connection with FIG. 1. In illustration a), in a plan view, there is shown in the upper half, a bead 420 which extends along the outer edge of the planar edge region and parallel to the delimiting edge, and in the lower half of the illustration, there are shown interrupted bead portions 421 and naps 422 whose function will be referred to below with reference to further illustrations.

In illustrations c) and d), on the right, there is shown an outer portion of an outer joint part 420 with a flange face 421 and with a recess 422 therein, and on the left there is shown a counter flange 416 with a planar counter flange face 417. Between the recess 422 and the counter flange face 417, there is formed an annular gap 418 into which there projects the edge region 427 of a sealing cover 415. The sealing cover is secured in the recess by means of an adhesive layer 423. In illustration c), the annular bead 431 projects beyond the flange plane 421 before the outer joint part and the flange are braced relative to one another. The annular bead 431 deviates from that of FIG. 3 in that it is formed out of the plate metal material of the sealing cover and is thus dimensionally stable and filled by the elastic adhesive layer 423.

In illustration d) the flange face 421 and the counter flange face 417 contact one another in a braced way. The annular bead 431 remains undeformed, whereas the adhesive layer 423 is pressed flat while being under permanent elastic pretension. The gap thickness shown in illustration c) comprises part of the tolerance permissible when producing the recess 421. The geometric conditions at the outer joint part 420 and at the counter flange 416 can also be interchanged, i.e. the flange face can be planar and the counter flange face can be provided with a recess.

Preferred embodiments have been disclosed. However, a worker in this art would recognize modifications would come within the scope of this invention. Thus, the following claims should be studied.

What is claimed is:

1. A sealing assembly for a constant velocity universal joint comprising:

an inner joint part connected to a shaft shank and having an outer joint part which is sealed relative to the shaft shank and which has a flange face defining a first plane relative to which outer joint part there is braced a counter flange which has a counter flange face;

a sealing cover at said outer joint part, said sealing cover is clamped in an edge region thereof between said outer joint part and said counter flange, said flange face directly contacts said counter flange face in an annular contact region, with an annular gap being formed radially inside said contact region between said flange face and said counter flange face said annular gap defining a recess with respect to said first plane, said sealing cover located in said annular gap with said edge region thereof and said sealing cover connected to said outer joint part by means of an adhesive layer which consists of a sealing agent and which is applied so as to have a sealing effect relative to said flange face and relative to said sealing cover and said sealing cover is at least partially displaced into said annular gap beyond said first plane by said counter flange while being under permanent pretension.

2. A sealing assembly according to claim 1, wherein said sealing cover is displaced into said annular gap with said adhesive layer being deformed.

3. A sealing assembly according to claim 1, wherein said sealing cover is displaced into said annular gap, with said edge region of said sealing cover being deformed.

4. A sealing assembly according to claim 3, wherein said edge region of said sealing cover comprises easily deformable formations.

5. A sealing assembly according to claim 3, wherein said edge region of said sealing cover is shaped to be conical in a plate-spring-like way.

6. A sealing assembly according to claim 3, wherein a continuous annular bead of said sealing cover is in contact with said counter flange face.

7. A sealing assembly according to claim 3, wherein circumferentially interrupted rib portions of said sealing cover are in contact with said counter flange face.

8. A sealing assembly according to claim 1, wherein said sealing cover consists of plastics.

9. A sealing assembly according to claim 8, wherein said plastic sealing cover is injection molded.

10. A sealing assembly according to claim 8, wherein said plastic sealing cover is deep drawn.

11. A sealing assembly according to claim 1, wherein said sealing cover consists of rubber.

12. A sealing assembly according to claim 11, wherein said rubber sealing cover has an insert chosen between one of fabric and fiber.

13. A sealing assembly according to claim 1, wherein said sealing cover consists of plate metal.

14. A sealing assembly according to claim 13, wherein said plate metal sealing cover has a plastic coating.

* * * * *